United States Patent
Oosterhof et al.

(10) Patent No.: US 11,695,169 B2
(45) Date of Patent: Jul. 4, 2023

(54) PROCESS FOR THE PREPARATION OF PRECURSOR COMPOUNDS FOR LITHIUM BATTERY CATHODES

(71) Applicant: UMICORE, Brussels (BE)

(72) Inventors: Harald Oosterhof, Westerlo (BE); Jean Scoyer, Herentals (BE); Lennart Scheunis, Olen (BE); Bart Klaasen, Olen (BE); Willem Callebaut, Hoboken (BE)

(73) Assignee: UMICORE, Brussels (BE)

( * ) Notice: Subject to any disclaimer, the term of this patent is extended or adjusted under 35 U.S.C. 154(b) by 0 days.

(21) Appl. No.: 17/604,002

(22) PCT Filed: Apr. 17, 2020

(86) PCT No.: PCT/EP2020/060806
§ 371 (c)(1),
(2) Date: Oct. 15, 2021

(87) PCT Pub. No.: WO2020/212546
PCT Pub. Date: Oct. 22, 2020

(65) Prior Publication Data
US 2022/0216534 A1 Jul. 7, 2022

(30) Foreign Application Priority Data
Apr. 19, 2019 (EP) .................. 19170392

(51) Int. Cl.
| | |
|---|---|
| H01M 10/00 | (2006.01) |
| H01M 10/54 | (2006.01) |
| C22B 1/00 | (2006.01) |
| C22B 3/00 | (2006.01) |
| H01M 6/52 | (2006.01) |
| C22B 7/00 | (2006.01) |
| C22B 26/12 | (2006.01) |
| C22B 47/00 | (2006.01) |

(52) U.S. Cl.
CPC ............ *H01M 10/54* (2013.01); *C22B 1/005* (2013.01); *C22B 7/003* (2013.01); *C22B 7/007* (2013.01); *C22B 23/0415* (2013.01); *C22B 23/0492* (2013.01); *C22B 26/12* (2013.01); *C22B 47/00* (2013.01); *H01M 6/52* (2013.01)

(58) Field of Classification Search
CPC .. H01M 10/0525; H01M 10/54; H01M 10/58; C22B 3/06; C22B 3/44; C22B 15/00
See application file for complete search history.

(56) References Cited

U.S. PATENT DOCUMENTS

| 9,834,827 B2 | 12/2017 | Wang et al. |
| 2017/0077564 A1 | 3/2017 | Wang et al. |

FOREIGN PATENT DOCUMENTS

| CL | 2021002722 A1 | 5/2022 | |
| CN | 103526035 A | 1/2014 | |
| CN | 104087758 A | 10/2014 | |
| CN | 107768763 A | 3/2018 | |
| CN | 108439438 A | 8/2018 | |
| CN | 110475879 A | * 11/2019 | ............... B09B 3/00 |
| EP | 1589121 B1 | 12/2008 | |
| WO | 2020212546 A1 | 10/2020 | |

OTHER PUBLICATIONS

Arakawa, Junichi et al. Method For Processing Waste Material Of Lithium Ion Battery, See the Abstract. (Year: 2019).*
EAPO; Office Action for Eurasian Patent Application No. 202192848 dated Aug. 29, 2022, 5 pages.
ISA/EP; International Search Report and Written Opinion for International Patent Application No. PCT/EP2020/060806 dated Jul. 2, 2020, 12 pages.
WIPO; International Preliminary Report on Patentability for International Patent Application No. PCT/EP2020/060806 dated Jul. 28, 2021, 15 pages.
Meshram, Pratima, et al., "Extraction of lithium from primary and secondary sources by pre-treatment, leaching and separation: a comprehensive review", Hyrdometallurgy, vol. 150, Oct. 2014, 17 pages.
Georgi-Maschler, T., et al., "Development of a recycling process for Li-ion batteries", Journal of Power Sources, vol. 207, Feb. 7, 2012, 10 pages.
Hu, Juntao, et al., "A promising approach for the recovery of high value-added metals from spent lithium-ion batteries", Journal of Power Sources, Elsevier SA, vol. 351, Mar. 29, 2017, 8 pages.
Weiguang LV et al., "A critical Review and Analysis of the Recycling of Spent Lithium-Ion Batteries", Sustainable Chemistry & Engineering, vol. 2018, No. 6, Dec. 13, 2017, 18 pages.
CNIPA; Office Action for Chinese Patent Application No. 202080029151.3 dated Feb. 13, 2023, 15 pages.

* cited by examiner

*Primary Examiner* — Cynthia H Kelly
*Assistant Examiner* — Monique M Wills
(74) *Attorney, Agent, or Firm* — NK Patent Law

(57) ABSTRACT

The present disclosure concerns the production of precursor compounds for lithium battery cathodes.

Batteries or their scrap are smelted in reducing conditions, thereby forming an alloy suitable for further hydrometallurgical refining, and a slag. The alloy is leached in acidic conditions, producing a Ni- and Co-bearing solution, which is refined.

The refining steps are greatly simplified as most elements susceptible to interfere with the refining steps concentrate in the slag. Metals such as Co, Ni and Mn are then precipitated from the solution, forming a suitable starting product for the synthesis of new battery precursor compounds.

14 Claims, No Drawings

PROCESS FOR THE PREPARATION OF PRECURSOR COMPOUNDS FOR LITHIUM BATTERY CATHODES

CROSS-REFERENCE TO RELATED APPLICATIONS

This application is a U.S. National Stage application of International Patent Application No. PCT/EP2020/060806, filed on Apr. 17, 2020, which claims the benefit of European Patent Application No. 19170392.5, filed on Apr. 19, 2019.

The present disclosure is related to lithium-ion rechargeable batteries. One of the prevailing battery chemistries involves cathode powders essentially consisting of oxides of the metals lithium, nickel, manganese, and cobalt (NMC). Another heavily used chemistry makes use of cathode powders essentially comprised of lithium, nickel, cobalt and aluminum (NCA), also in the form of oxides.

During the lifecycle of a lithium-ion battery, a variety of waste materials is produced that needs be recycled to be compliant with the environmental regulation and legislation.

Already during the manufacturing process of the batteries, production waste is generated due to hard to meet quality standards. Off-spec intermediates must therefore be dealt with. Such materials vary from cathode powders, electrode foils, separator foils, to complete battery cells or modules that are charged and contain electrolyte.

Besides production waste, end-of-life batteries also need to be recycled. This results in even more complex waste streams, mainly comprising lithium batteries including all their ingredients together with electrical or electronical components, but possibly also comprising minor amounts of non-lithium batteries such nickel-cadmium, nickel-metal-hydride and zinc batteries.

Derivatives of these production wastes and end-of-life batteries are also available for recycling, in the form of powder fractions or black masses, which are the result of a mechanical and/or thermal pretreatment.

The chemical complexity of scrapped materials increases towards the end of the manufacturing process, as more and more ingredients are added to the product. Hence, battery cells and modules contain a large part of the elements in the Periodic Table, for example Ni, Co, Mn, Li, Fe, Al, V, P, F, C, Ti, and Mg in the cathode, Li, Ti, Si, C, Al, and Cu in the anode, Li, F, P, and volatile organic compounds in the electrolyte, and Al, Fe, Cu, Ni, Cr, and plastics with Cl and Br in the casing.

The amount of spent batteries is expected to exceed 100,000 tons per year during the coming 10 years, mainly due to the ongoing electrification of the automotive industry. The battery recycling business will grow correspondingly.

The present disclosure concerns the production of precursor compounds for lithium battery cathodes. The traditional approach to cathode manufacturing consists in producing pure separate nickel, manganese, and cobalt precursor compounds, which are mixed according to precise ratios, and then fired together with a lithium compound.

A modified production scheme has been proposed starting from spent batteries, taking profit from the essential elements being nickel, manganese, and cobalt therein: these metals are refined together instead of being separated and purified individually. A suitably refined mixture could indeed contain the 3 essential elements in a ratio suitable for re-use in the preparation of fresh cathodes.

Such a scheme is illustrated in U.S. Pat. No. 9,834,827. This scheme is based on a hydrometallurgy treatment of cathode material recovered from spent battery cells. Although promising in theory, it introduces practical challenges. The process indeed requires preliminary separation steps to isolate the cathode material from the casing and from other battery components. This involves mechanical (by crushing) and physical (by magnetic separation) treatments, removal of PVDF (using a solvent), and removal of Cu and Al (by precipitation and filtration) before any chemical purification of the nickel, manganese and cobalt is performed. Drawbacks are:

the batteries are crushed and shredded, which is a dangerous process step with potential emissions of toxic volatile compounds and/or fine particles; during crushing and shredding, fires or explosions may occur, in particular if batteries have not been properly discharged;

the electrolyte, which usually is based on $LiPF_6$, requires polycarbonate solvents that are dangerous due to their high vapor pressure;

N-methyl-2-pyrrolidone (NMP) is used to dissolve the PVDF binder, involving health-risks due to the carcinogenic nature of NMP; NMP would only be recovered after an undisclosed and likely complex treatment of the NMP-PVDF mixture;

the purification of nickel, manganese, and cobalt entails complex steps as the leaching operation is not selective, leading to the presence many undesired impurities in the mother liquor.

The above purification steps suffer e.g. from the presence of F, which can generate HF in acidic media, from Cd in a feed that may contain some Ni—Cd batteries, from Zn in a feed that may contain alkaline batteries. Al and Si will likely be present and are typically responsible for extremely slow filtration rates.

Meshram et al. [Hydrometallurgy, V. 150, p. 192-208, 2014] describes a process where during the hydrometallurgical refining of Ni and Co, Ni and Co are extracted from the leaching solution by solvent extraction.

CN108439438 describes a process, in which calcined lithium-containing battery waste is acid-leached, producing a Li, Co, Ni, Mn, Al, Fe and Cu containing solution, from which first Cu, Fe and Al are removed, after which Li is removed by solvent extraction with an extraction agent, followed by crystallization of a mixed Ni, Co, Mn sulfate. Such a process is also known from CN107768763, in which the battery waste is leached in acid, after which Cu, Fe and Al are removed from the obtained solution by precipitation, after which Li is removed as LiF, followed by crystallization of a mixed Ni, Co, Mn sulfate. One major disadvantage of these processes is that impurities such as Li, Al and others are present in the leaching solution and need to be removed in several steps before a crystallization of Co and Ni.

The process according to the invention overcomes these limitations. It also offers a much more robust alternative in that a variety of impurities can be dealt with while still ensuring a consistent quality of the cathode precursors. The invention concerns more particularly a process for the preparation of a precursor compound for the synthesis of cathode material for rechargeable lithium batteries, comprising the steps of:

reducing smelting of a metallurgical charge comprising spent rechargeable lithium batteries or their scrap containing Ni, Co, Al, Li, F, either one or both of Cu and Fe, and fluxing agents, thereby producing an alloy comprising the major part of the Ni, Co, and Cu, at least part of the Fe, and depleted in Al, Li and F;

leaching the alloy in a mineral acid, thereby obtaining a Ni- and Co-bearing solution also containing either one or both of Cu and Fe;

refining the nickel- and cobalt-bearing solution, by removing the therein contained Cu and Fe, thereby obtaining a purified Ni- and Co-bearing solution;

simultaneous precipitation of Ni and Co from the purified Ni- and Co-bearing solution as oxides, hydroxides or salts, by heat treatment, crystallization, or addition of hydroxide or carbonate, carbonate, thereby obtaining a solid suitable for the synthesis of cathode material for rechargeable lithium batteries.

By spent rechargeable lithium batteries or their scrap are meant recycled materials from the battery industry such as: black mass, cathode powders, electrode foils, separator foils, complete battery cells or modules. Electronics associated with the batteries may also be present, as well as batteries according to other chemistries such as NiCd, NiMH, or Zn.

The feed, the alloy, and consequently also the Ni- and Co-bearing solution, will in most practical cases contain both Fe and Cu. However, specific feeds may hold only one of those elements in appreciable quantities. It is obvious that in such circumstances, only one of Fe and Cu needs to be removed in the refining step. The Ni- and Co-bearing solution may also be depleted in Cu if the leaching of Co and Ni is performed under controlled pH and redox potential, thereby avoiding to dissolve Cu.

The refining step specifically defines that the impurities are removed from the solution. The advantage of this scheme is that only minor amounts of chemicals are needed compared to a refining process wherein the desired elements Co and Ni would be extracted from the solution.

By simultaneous precipitation of Ni and Co is meant that both elements are essentially completely precipitated in the same process step, preferably in the form of an intimate mixture.

Optionally, at least part of the Mn is co-precipitated with Ni and Co. By precipitation is meant that a solid phase is formed; this can be obtained by physical means such as by water evaporation and/or crystallization, or by chemical means such as by adding hydroxides and/or carbonates.

The alloy is preferably granulated, atomized or comminuted before the leaching step. This allows for faster leaching kinetics. The mineral acid used in the leaching step is advantageously $H_2SO_4$ as this is acid most commonly used in the preparation of precursor compound for the synthesis of cathode material for rechargeable lithium batteries. HCl, $HNO_3$, and $H_3PO_4$ would however also be appropriate.

The leaching yield can be optimized when performed under oxidizing conditions, such as by using $O_2$ or $H_2O_2$ as oxidizing agent.

The de-coppering operation can advantageously be performed using the alloy itself as cementation agent. Other metals more easily oxidized than Cu can be used, such as Ni. Other adequate de-coppering methods are: sulfide precipitation, solvent exchange, and electrowinning.

The leaching of Co and Ni can be performed under controlled pH and redox potential, thereby avoiding to dissolve Cu. This option is equivalent to performing the steps of leaching and of removal of Cu in the same reactor, e.g. by performing a cementation immediately after the leaching step.

The removal of Fe can be dealt with by imposing oxidizing conditions to the solution, so as to precipitate a $Fe^{3+}$ compound, preferably using $O_2$ or $H_2O_2$ as oxidizing agent.

To facilitate the direct re-use of the Ni- and Co-precipitate for the preparation of cathode materials, it is advantageous to adjust the Ni, Co, and optionally the Mn concentration, in the Ni- and Co-bearing solution so as to obtain a precipitate having suitable Ni to Co, or Ni to Co to Mn ratios. This goal can easily be achieved by the addition of any one or more of these elements as a soluble compound, either or not in aqueous solution.

Contrasting to a process where the battery materials are directly leached, the smelting pre-treatment according to the invention efficiently isolates the Ni, Co, and Mn from the bulk of the other elements that can be expected in the feed. Elements like Al, Li, F, Ti, Pb, Zn, Cd, Cl, Br, Mg, Ca, V, C, Si, S and P will report to the oxidized slag phase and/or to the flue dust. This upfront purification step simplifies the subsequent hydrometallurgical purification steps significantly, by avoiding problems like:

filtration problems caused by gel formation of the dissolved Al and Si;

the emissions of toxic, harmful, acidic gasses formed by F, Cl, Br and S in the acidic environment of the leaching step;

The co-precipitation of Li in the step of precipitation of Ni and Co;

The contamination of Ni and Co by impurities such as Pb, Zn, Cd, impacting the electrochemical performance of the eventual cathode material.

Contrasting to a known process where the battery materials are directly leached, the smelting pre-treatment according to the present process avoids the need for discharging the batteries, and for crushing or shredding them before leaching. Such processes generate harmful gases and fine particulate matter. Thanks to the upfront purification, the refining steps can be performed by removal of impurities instead of necessitating solvent extraction using toxic solvents. Li can be recovered from the slag using known means.

The following example illustrates the invention.

End of life batteries with a composition given Table 1 are recycled in a 60-liter alumina crucible. A starting slag is melted to a temperature of 1450° C. using an induction furnace. Once this temperature is reached, a mixture of end of life batteries and fluxes is gradually added to the liquid slag over a period of 2 hours. Over this time, 50 kg of batteries are added together with 10 kg of limestone and 5 kg of sand to ensure the slag composition with a suitable composition. $O_2$ is blown at a rate of 220 L/h above the bath during the loading of the feed to combust any metallic Al and carbon in the batteries. Once the final addition is made, CO is blow through the bath at a rate of 300 L/h for 1 hour to obtain the desired reduction degree. Samples are taken from the slag and the alloy and the phases are separated after cooling. The composition of the resulting phases is shown in Table 2.

TABLE 1

Composition in wt. % of end of life batteries

| Al | Fe | Mn | Co | Cu | Ni | Li | C |
|----|----|----|----|----|----|----|---|
| 10 | 2 | 4 | 4 | 9 | 13 | 2.5 | 25 |

TABLE 2

Detailed material balance of the smelting operation with compositions in wt. %

| Input | Mass (kg) | Al | Si | Ca | Fe | Mn | Co | Cu | Ni | Li | C |
|---|---|---|---|---|---|---|---|---|---|---|---|
| Starting slag | 20 | 20 | 13 | 19 | — | 3 | 0.2 | | 0.1 | | 4 |
| Batteries | 50 | 10 | — | — | 2 | 4 | 4 | 9 | 13 | 2.5 | 25 |
| Limestone | 10 | — | 2.2 | 38.0 | — | — | — | — | — | — | 11.7 |
| Sand | 5 | — | 46.7 | — | — | — | — | — | — | — | — |

| Output | Mass (kg) | Al | Si | Ca | Fe | Mn | Co | Cu | Ni | Li |
|---|---|---|---|---|---|---|---|---|---|---|
| Alloy | 15 | 0.0 | 0.0 | 0.0 | 6.6 | 5.8 | 13.6 | 30.0 | 43.5 | 0.0 |
| Slag | 43 | 19.8 | 11.8 | 17.6 | 0.1 | 4.0 | 0.2 | 0.0 | 0.1 | 3.0 |

| Yield | Al | Si | Ca | Fe | Mn | Co | Cu | Ni | Li |
|---|---|---|---|---|---|---|---|---|---|
| Alloy | 0.0 | 0.0 | 0.0 | 92.0 | 33.3 | 95.9 | 99.1 | 99.1 | 0.0 |
| Slag | 100.0 | 100.0 | 100.0 | 8.0 | 66.7 | 4.1 | 0.9 | 0.9 | 100.0 |

Part of the alloy phase from the smelting operation is re-melted under inert atmosphere and atomized in a water jet. This yields a powder fraction that is sufficiently fine for leaching and subsequent hydrometallurgical processing.

600 g of atomized powder is added to a glass beaker filled with 5 L of water. An agitator is used for suspending the powder and for the distribution of oxygen gas that is injected at the bottom of the beaker. The oxygen acts as an oxidizing agent during leaching. The mixture is heated and maintained at 80° C. Concentrated sulfuric acid is slowly supplied to dissolve the powder. The acid flow is controlled to maintain a pH above 1. After adding a near-stoichiometric amount of acid, pH 1 can be maintained without supplying addition acid. This is the end point of the leaching step, at which stage essentially all metal is dissolved. The beaker is cooled, and the content is filtered. The composition of the solution is shown in Table 3.

TABLE 3

Composition in g/L of the solution after leaching

| Fe | Mn | Co | Cu | Ni |
|---|---|---|---|---|
| 8 | 7 | 17 | 37 | 54 |

Next, Cu is selectively removed from this solution by cementation with Ni powder. This is performed by slowly pumping the leach solution into another heated and agitated beaker while simultaneously adding a stoichiometric excess amount of Ni powder to the same beaker. During this process, Ni exchanges with Cu in solution. After filtration, a mixed Cu—Ni cement, and a de-coppered solution is obtained.

In a next step, Fe is removed by hydrolysis. This is performed by reheating the de-coppered solution to 80° C. Oxygen gas is injected in the agitated beaker and a $Na_2CO_3$ solution is slowly added until a pH of 4 is reached. Under these conditions, iron is precipitated. After filtration, an iron cake and a filtrate are obtained. The composition of the filtrate is shown in Table 4.

TABLE 4

Composition in g/L of the solution after refining

| Fe | Mn | Co | Cu | Ni |
|---|---|---|---|---|
| <0.01 | 5 | 12 | <0.01 | 65 |

The Co, Mn and Ni concentrations are then corrected to achieve the desired Ni to Co to Mn ratio before final precipitation of the NMC hydroxide product. In this example we aim for a molar ratio of Ni:Co:Mn of 6:2:2. This is achieved by reheating the solution in an agitated beaker at 80° C., adding suitable amounts of cobalt sulfate and manganese sulfate crystals. Also some water is added in this step to obtain the concentrations shown in Table 5.

TABLE 5

Composition in g/L of the solution after adjusting the Ni:Co:Mn ratio

| Fe | Mn | Co | Cu | Ni |
|---|---|---|---|---|
| <0.01 | 17 | 18 | <0.01 | 55 |

Finally, the NMC metals are precipitated by slowly adding a concentrated NaOH solution until a pH of 10 is reached. After cooling, the NMC hydroxide product is be separated by filtration and washed. Table 6 shows the composition of the final product on dry basis, which is suitable for the synthesis of new battery precursor compounds.

TABLE 6

Composition in wt. % (on dry) of the solids after precipitation

| Fe | Mn | Co | Cu | Ni |
|---|---|---|---|---|
| 0 | 12 | 13 | 0 | 38 |

The invention claimed is:

1. A process for the preparation of a precursor compound for the synthesis of cathode material for rechargeable lithium batteries, comprising the steps of:
   reducing smelting of a metallurgical charge comprising spent rechargeable lithium batteries or their scrap containing Ni, Co, Al, Li, F, either one or both of Cu and Fe, and fluxing agents, thereby producing an alloy comprising the major part of the Ni, Co, and Cu, at least part of the Fe, and depleted in Al, Li and F;

leaching the alloy in a mineral acid, thereby obtaining a Ni- and Co-bearing solution also containing either one or both of Cu and Fe;

refining the Ni- and Co-bearing solution, by removing the therein contained Cu and Fe, thereby obtaining a purified Ni- and Co-bearing solution; and simultaneous precipitation of Ni and Co from the purified Ni- and Co-bearing solution as hydroxides or salts, by heat treatment, crystallization, or addition of hydroxide or carbonate, thereby obtaining a solid suitable for the synthesis of cathode material for rechargeable lithium batteries.

2. The process according to claim 1, wherein the process is free from a solvent extraction or ion exchange step in which Ni and/or Co are extracted from the Ni- and Co-bearing solution.

3. The process according to claim 1, wherein the alloy is granulated, atomized or comminuted before the leaching step.

4. The process according to claim 1, wherein the mineral acid is $H_2SO_4$.

5. The process according to claim 1, wherein the step of leaching is performed under oxidizing conditions.

6. The process according to claim 5, wherein the step of leaching is performed under oxidizing conditions using $O_2$ or $H_2O_2$ as oxidizing agent.

7. The process according to claim 5, wherein the removal of Cu in the refining step is performed by precipitation.

8. The process according to claim 7, wherein the removal of Cu in the refining step is performed by precipitation using cementation with the alloy.

9. The process according to claim 1, wherein, in the step of leaching, Co is leached selectively versus Cu by control of pH and redox potential during leaching.

10. The process according to claim 1, wherein the removal of Fe in the refining step is performed under oxidizing conditions leading to the precipitation of a $Fe^{3+}$ compound.

11. The process according to claim 10, wherein the removal of Fe in the refining step is performed under oxidizing conditions leading to the precipitation of a $Fe^{3+}$ compound using $O_2$ or $H_2O_2$ as oxidizing agent.

12. The process according to claim 1, wherein, between the steps of leaching and precipitation, the ratio of the elements Ni to Co to Mn in the purified Ni- and Co-bearing solution is adjusted to a preset value by addition of any one of these elements as a soluble compound.

13. The process according to claim 1, wherein said precursor compound is a solid Ni- and Co-containing product and said solid suitable for the synthesis of cathode material for rechargeable lithium batteries is the same solid Ni- and Co-containing product.

14. The process according to claim 13, wherein the Ni- and Co-containing product also contains Mn, wherein, during the simultaneous precipitation of Ni and Co from the purified Ni- and Co-bearing solution, also a Mn-oxide and/or Mn-hydroxide and/or a Mn-salt is precipitated, by heat treatment, crystallization, or addition of a source of hydroxide ions or carbonate ions, thereby obtaining said Ni- and Co-containing product also containing Mn.

* * * * *